Figure 1:
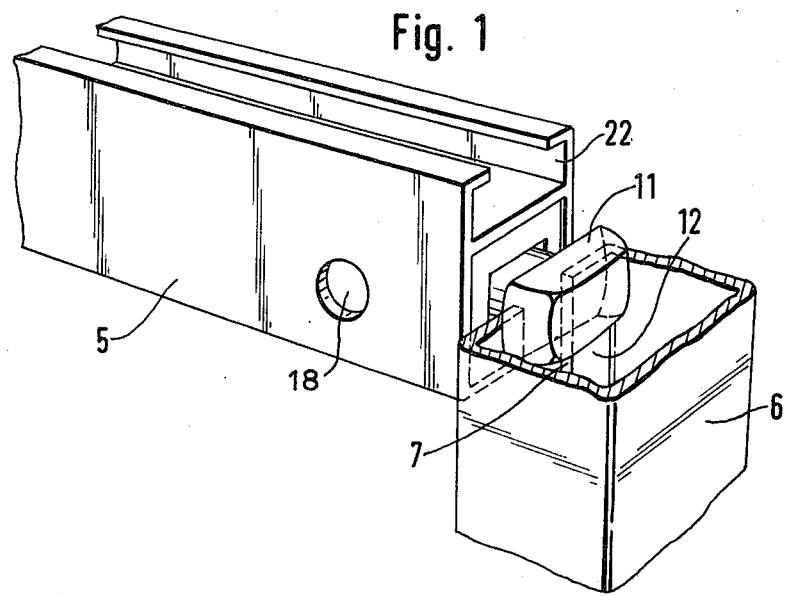

United States Patent [19]

Wahlin

[11] 4,334,797
[45] Jun. 15, 1982

[54] COUPLING ELEMENT

[76] Inventor: Bo. O. Wahlin, Hinsholmsgatans 7, S-421 77 Västra Frölunda, Sweden

[21] Appl. No.: 141,195

[22] Filed: Apr. 17, 1980

[30] Foreign Application Priority Data

Apr. 27, 1979 [SE] Sweden ............................ 7903736

[51] Int. Cl.³ .................... B25G 3/00; F16B 9/00; F16L 41/00
[52] U.S. Cl. ............................... 403/252; 403/189; 403/171
[58] Field of Search ............... 403/252, 264, 258, 260, 403/170, 171, 172, 174, 176, 178, 231, 189

[56] References Cited

U.S. PATENT DOCUMENTS 3,580,620  5/1971  Offenbroich ................. 403/252 X
3,672,710  6/1972  Kroopp ........................ 403/252 X

FOREIGN PATENT DOCUMENTS 2603228  1/1977  Fed. Rep. of Germany ...... 403/252
2255491  7/1975  France ............................ 403/264
                (Addition to No. 45532)
2387370 11/1978  France ............................ 403/264
                (Addition to No. 10891)
 403207  6/1966  Switzerland ..................... 403/264

Primary Examiner—Wayne L. Shedd

[57] ABSTRACT

A coupling system is described for the detachable assembly of two building elements, the first having a slot for receiving the head of a lock bolt and the second having an elongated cavity for receiving the shank of the lock bolt; and a lock assembly comprising an elongated casing adapted to fit within said cavity, the inner portion thereof being provided with an insert body movable in a direction lateral to said casing and the innermost portion thereof being provided with a leaf spring engaging said insert during assembly of the system, the insert body being provided with a central axial opening for receiving said lock bolt shank and a threaded bore connecting an outerface thereof and said central opening for receiving a locking screw for said bolt and an annular projection on said outer face surrounding said threaded bore for engaging a hole provided in a face of said second building element. The leaf spring is adapted to engage during assembly first said insert body to urge the same laterally to facilitate engagement of said annular projection with the hole in said second building element to lock the same axially and later to engage the inner end of said bolt shank and urge the same outwardly in the longitudinal direction of the bolt.

4 Claims, 8 Drawing Figures

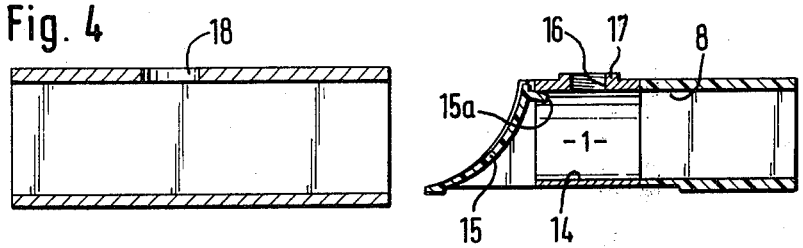
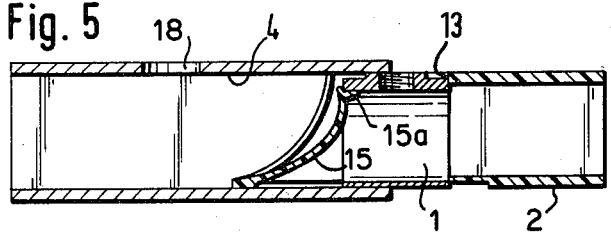
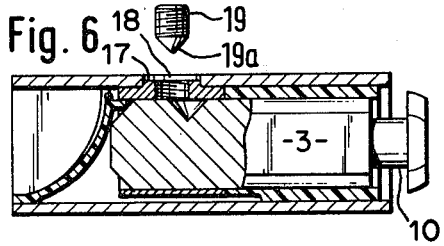
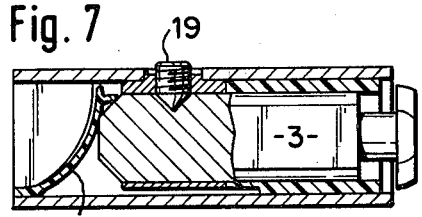
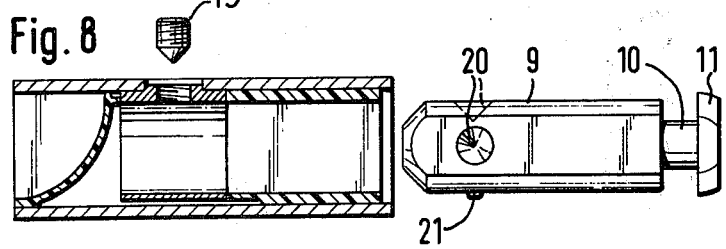

COUPLING ELEMENT

The present invention relates to a coupling element for the detachable coupling together of two building elements, of which the first one in its side is provided with an opening, to which an inwardly facing stop dog surface in the interior of the building element is connected, the other one having a tunnel-shaped cavity, which in mounted condition is open in a direction toward said first element, the coupling element comprising an insert, which before the mounting operation of the two building elements can be introduced into the tunnel-shaped cavity and comprises for one thing a lock assembly adapted to the cross-sectional form of the tunnel-shaped cavity, to which it can be locked, and for another thing a lock bolt, which can be displaced in and locked to the lock assembly, which lock bolt is provided with a head, which can be inserted into the lateral opening of the first building element, said head being provided with shoulders, which under axial displacement of the lock bolt can be pressed against said inwardly facing stop dog surfaces, the axial displacement and the locking together taking place by means of a sideways pointed tightening screw, which can be reached through a lateral opening is the wall of the tunnel-shaped cavity, the end portion of the tightening screw cooperating with an oblique surface of the lock bolt, said lock bolt being subjected to the bias of a spring in the projecting direction.

It is a principal object of the invention to provide a coupling element of the kind mentioned above, which is of simple design, comprises as few parts as possible and which is easy to handle, i.e. easy to mount and disassemble while at the same time preventing the parts entering into the element assembly from unintentionally falling apart during handling.

Said object is accomplished by means of a coupling element designed according to the invention, which is substantially characterized by a lock assembly comprising for one thing a shell case, the outer form of which follows the form of the tunnel-shaped cavity and the inner form of which follows the outer contour of the lock bolt, and for another thing an insert, which is laterally displaceable relative to the shell case and on one of its sides is provided with a socket and an axial hole, which in inserted condition of the lock bolt is traversed by the same, the distance between the hole and the lateral socket being adapted in such a way that in inserted condition of the lock bolt the socket extends outside of the outer contour of the shell case into a hole through the wall of the tunnel-shaped space and thus locks the lock assembly against any axial displacement relative to said other building element. The shell case insert is provided with a transverse spring-like tongue, which in the inserted condition of the lock bolt with spring bias abuts against its end and thus tends to push the same outwardly, in which arrangement the spring-like tongue in extracted condition of the lock bolt can bear against a stop dog of the insert in such a way that the tongue under spring bias tends to maintain the insert in a laterally displaced position relative to the shell case.

Figure 3:
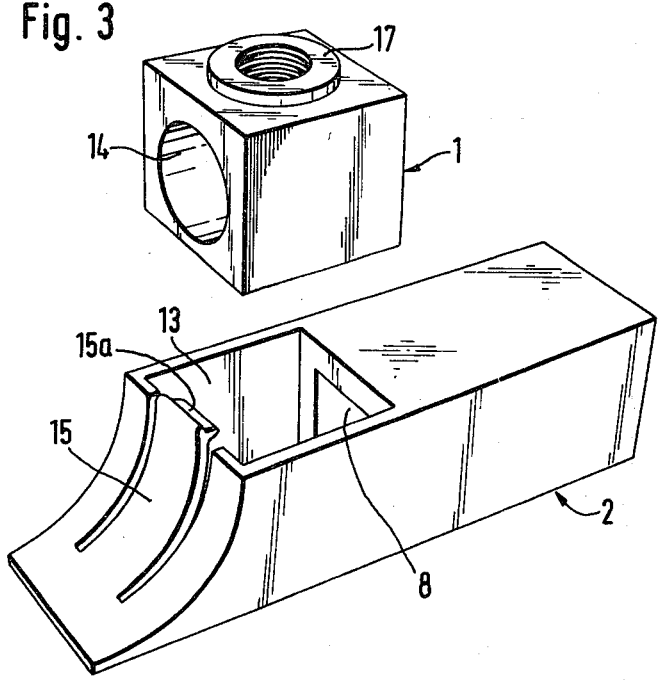
Figure 2:
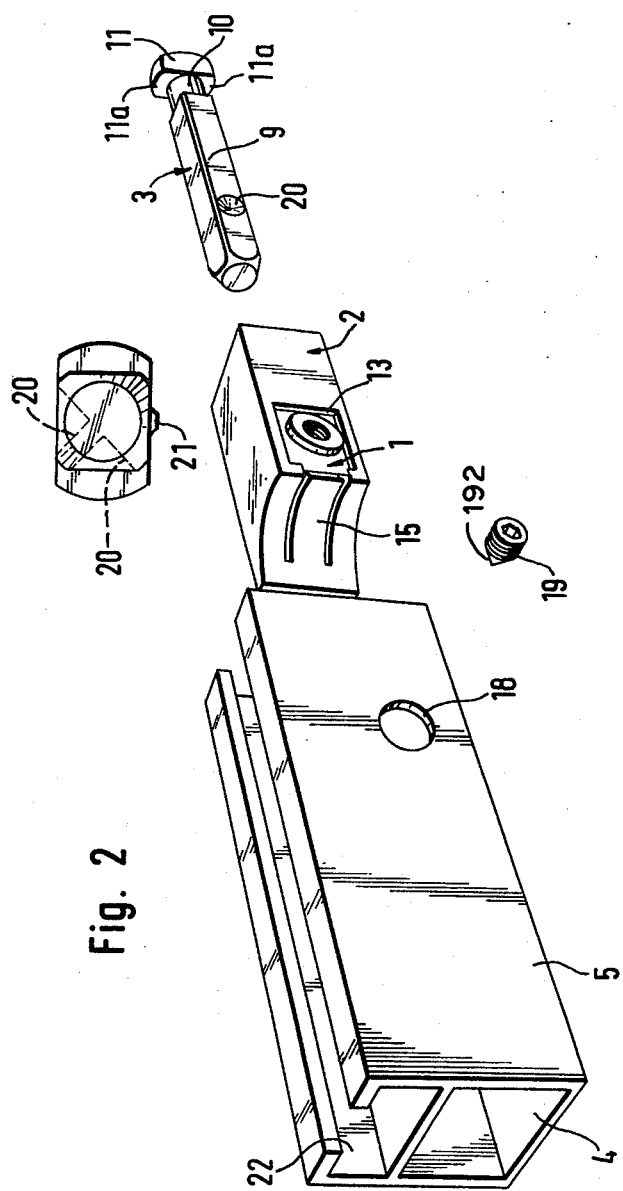

In the following an example of embodiment of the invention will be described, reference being made to the accompanying drawings, in which FIG. 1 is a view of two building elements mounted together by means of a coupling element according to the invention, FIG. 2 is an exploded view illustrating the same coupling element with one end portion of a building element belonging to the same, FIG. 3 is an exploded view of two details forming part of the coupling element, and FIGS. 4-8 show the coupling element designed according to the invention in longitudinal cross-section in different phases of mounting.

The coupling element illustrated in the drawings comprises three principal parts, i.e. an insert 1, a shell case insert 2, which is intended to take up the insert, and finally a lock bolt 3.

The shell case 2 and the insert 1 are intended to be inserted into a tunnel-shaped cavity 4 of one building element 5 and the lock bolt 3 is intended to be inserted into and hooked up in another building element 6 in a manner, which will be described below.

In the illustrated embodiment the building element 5 is a hollow profiled element of rectangular cross-section. The building element 6 is likewise a hollow profile element, which, however, is provided with a slit-shaped opening 7 in one of its sides. The shell case 2 has an outer configuration, which corresponds to the interior shape of the cavity 4 and contains a central hole 8, which forms a sliding guide for a shank portion 9 of the lock bolt 3. The shank portion 9 of the lock bolt 3 via a narrower neck portion 10 terminates in a head 11, which is provided with laterally projecting shoulders 11a. In the one direction the width of the head approximately corresponds to the diameter of the neck portion 10. The width of the head is smaller than the width of the slit 7 of the building element 6. This means that the head can be introduced into the building element 6 through the slit 7, when the head is turned parallel to the slit, and that it can be made to abut against the internal stop dog surfaces 12 constituted by the wall portions of the building element located adjacent to the slit 7. A transverse hole 13 is made in the shell case 2, in which the insert 1 is placed. The insert has such a shape that it fills up the hole 13. The insert 1 contains an axial through hole 14, the diameter of which substantially corresponds to the outer diameter of the shank 9 of the lock bolt 3. In the portion of the insert shown in FIG. 4 the hole 14 occupies a coaxial position relative to the hole 8 of the shell case. The end of the shell case located adjacent the insert 1 supports a spring-like tongue 15 bent in arc shape, and which on its side facing the insert has a projection 15a. One wall of the insert is traversed by a threaded bore 16 extending through a socket-like annular projection 17 extending outwardly from the wall of the insert. In the position illustrated in FIG. 4 the socket 17 projects outside of the outer contour of the shell case 2. A hole made in the building element 5 is indicated by 18 (FIGS. 2 and 4), its diameter substantially corresponding to the outer diameter of the socket 17. A locking and tightening screw, which can be screwed into the threaded portion 16 as indicated by 19 is provided with a conical end portion 19a. Conically shaped recesses 20 are made in two sides of the shank portion 9 of the lock bolt 3 to receive the corresponding portion 19a.

The assembly operation suitably takes place in such a manner that the insert 1 is laterally inserted into the shell case 2 past the projection 15a of the spring 15, so that it occupies the position shown in FIG. 4, in which the projection 15a rests against the inside of the wall of the insert 1. In this position as has been mentioned above the socket 17 projects outside of the outer contour of the shell case 2. The lock assembly constituted by the shell case 2 and the insert 1 can thereafter be introduced into the building element 5, if the operator process the insert 1 against bias of the plate spring 15 in an inward direction, whereby said plate spring will be bent downwards and form a bulge at its middle portion. In this pressed-in condition of the insert the lock assembly can be pushed in, as is evident from FIG. 5. When the lock assembly has been pushed in so far that the socket 17 reaches the hole 18, the socket actuated by the spring 15 snaps out through the hole 18 as is shown in FIG. 6. In this position the lock assembly is locked against axial displacement relative to the building element 5. The lock bolt 3 is subsequently inserted into the position shown in FIG. 6. The spring 15 is thereby moved in such a manner that the projection 15a becomes disengagement from insert 1 and instead acts upon the lock bolt 3 in such a way that the spring tends to push the lock bolt to the right according to the FIGS. 6 and 7. When screwing in the tightening screw 19, its conical point 19a will slide against the oblique surface of the recess 20 and thus move the lock bolt to the left against the bias of the spring 15. Before the tightening screw 19 is tightened, the head 11 of the lock bolt 3 is introduced through the slit 7 of the building element 6 and is turned through 90° into the position shown in FIG. 1. The tightening screw 19 is thereafter tightened, which means that the shoulders 11a are pressed against the stop dog surfaces 12 of the building element 6, while the building element 5 with its end is pressed against the outside of the building element 6. Disassembly suitably takes place in such a way that the tightening screw 19 is removed, whereafter the lock bolt 3 can be pulled out. As the spring 15 is swung in such a manner that its projection 15a has lost its engagement with the insert 1, the latter one can easily be pushed downwardly, so that the socket 17 gets clear of the hole 18, whereafter the lock assembly can freely fall out of the building element 5. In order to impede the lock bolt 3 from unintentionally falling out of the insert 1 and the shell case 2, its neck is provided with a bulge 21 made by means of a stamping operation. The bulge 2 is such that the lock bolt can be pulled out of the shell case against a certain frictional resistance. This bulge can of course be provided in a different manner. By way of example the shank can be provided with an annular waist, which brings about a displacement of material producing an adjacent thicker portion. It is of course also possible to design the neck with such a dimension that it can be inserted into the shell case against a certain frictional resistance. In the illustrated embodiment the tongue 15 is cast in one integrated piece with the shell case, which to advantage can be made of plastics. For the sake of strength, the insert 1 is suitably made of metal. When the lock bolt 3 is inserted into the shell case 2 and the insert 1, the same prevents the lock assembly from being transversely displaced also when the engagement of the projection 15a with the insert has ceased. The building element 5 illustrated in FIGS. 1 and 2 is provided with an undercut groove 22 in its side, which groove can receive the head of another lock bolt 3. It is of course also possible to design the building profile 6 in this form.

The invention is not limited to the embodiment described above and illustrated in the drawings by way of example only, but can be varied as to its details within the scope of the following claims.

I claim:

1. A coupling system for the detachable assembly of two building elements, the first having a slot for receiving the head of a lock bolt and the second having an elongated cavity for receiving the shank of said lock bolt and a lock assembly comprising an elongated casing adapted to fit within said cavity, the inner portion thereof being provided with an insert body movable in a direction lateral to said casing and the innermost portion thereof being provided with a leaf spring engaging said insert during assembly of the system, said insert body being provided with a central axial opening for receiving said lock bolt shank and a threaded bore connecting an outerface thereof and said central opening for receiving a locking screw for said bolt and an annular projection on said outer face surrounding said threaded bore for engaging a hole provided in a face of said second building element, said leaf spring being adapted to engage during assembly first said insert body to urge the same laterally to facilitate engagement of said annular projection with the hole in said second building element to lock the same axially and later to engage the inner end of said bolt shank and urge the same outwardly in the longitudinal direction of the bolt.

2. A system according to claim 1, wherein said insert body is inserted in said casing through an opening formed in the wall of said casing.

3. A system according to claim 1 or claim 2, wherein said leaf spring is arcuately shaped and provided with a projection engageable with the central axial opening of said insert body to urge the same outwardly in a lateral direction.

4. A system according to claim 3, wherein said leaf spring is formed as an integral part of said casing.

* * * * *